US007770370B2

(12) United States Patent
Komorida et al.

(10) Patent No.: US 7,770,370 B2
(45) Date of Patent: Aug. 10, 2010

(54) DEVICE FOR LIMITING LOWERING OF IMPLEMENT ON WORKING VEHICLE

(75) Inventors: Takeshi Komorida, Sakai (JP); Yoshiyuki Esaki, Sakai (JP); Yoshikazu Togoshi, Osaka (JP); Eiji Satou, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 12/051,824

(22) Filed: Mar. 19, 2008

(65) Prior Publication Data
US 2008/0302077 A1 Dec. 11, 2008

(30) Foreign Application Priority Data
Jun. 5, 2007 (JP) .............................. 2007-149320

(51) Int. Cl.
*A01D 34/00* (2006.01)
(52) U.S. Cl. ......................................... 56/17.1; 56/15.2
(58) Field of Classification Search ................. 56/14.7, 56/14.9, 15.7–15.9, 16.3, 16.7, 17.1, DIG. 22, 56/320.1, 15.2
See application file for complete search history.

(56) References Cited

U.S. PATENT DOCUMENTS

| 4,664,405 | A | * | 5/1987 | Bedis ........................... 172/298 |
| 4,760,686 | A | * | 8/1988 | Samejima et al. ............. 56/15.8 |
| 5,351,467 | A | * | 10/1994 | Trefz et al. .................... 56/16.3 |
| 5,410,865 | A | * | 5/1995 | Kurohara et al. .............. 56/15.9 |
| 5,784,870 | A | * | 7/1998 | Seegert et al. ............... 56/320.1 |
| 6,122,903 | A | * | 9/2000 | Hayashi et al. ............... 56/15.8 |
| 6,427,430 | B1 | * | 8/2002 | Swartzendruber ........... 56/16.3 |
| 6,530,200 | B1 | * | 3/2003 | Minoura et al. .............. 56/17.1 |
| 6,588,188 | B2 | * | 7/2003 | Dennis ........................ 56/16.3 |
| 6,658,831 | B2 | * | 12/2003 | Velke et al. ................... 56/14.7 |
| 6,837,032 | B1 | * | 1/2005 | Swartzendruber et al. ..... 56/14.9 |
| 6,868,658 | B2 | * | 3/2005 | Velke et al. ................... 56/15.8 |
| 2007/0012016 | A1 | * | 1/2007 | Strope ......................... 56/17.1 |
| 2007/0107403 | A1 | * | 5/2007 | Velke et al. ................... 56/14.7 |
| 2007/0169456 | A1 | * | 7/2007 | Komorida et al. ............ 56/17.1 |
| 2008/0034723 | A1 | * | 2/2008 | Wright et al. ................ 56/17.1 |
| 2008/0190087 | A1 | * | 8/2008 | Elhardt et al. ................ 56/17.1 |

FOREIGN PATENT DOCUMENTS

JP 2004-236641 A 8/2004

* cited by examiner

*Primary Examiner*—Thomas B Will
*Assistant Examiner*—Joan D Misa
(74) *Attorney, Agent, or Firm*—The Webb Law Firm

(57) ABSTRACT

A working vehicle includes a vehicle body supported by a plurality of wheels; an implement supported by the vehicle body via a link mechanism such that the implement can be raised and lowered, the implement being permitted to be lowered under its own weight; an abutting member that moves in tandem with the raising and lowering movement of the implement; a receiving piece for limiting the lowering of the implement under its own weight by receiving a first portion of the abutting member; and a manually operable first operating piece for changing the position of the receiving piece between a receiving position and a retracted position, wherein a lowering limiting position is set to a vertical position that is closer to the upper limit of a range of the raising or lowering movement of the implement than to the lower limit of that range.

11 Claims, 5 Drawing Sheets

DEVICE FOR LIMITING LOWERING OF IMPLEMENT ON WORKING VEHICLE

BACKGROUND OF THE INVENTION

The present invention relates to a device for limiting the lowering of an implement on a working vehicle.

In some working vehicles, an implement is coupled to a vehicle body via a link mechanism such that the implement can be raised and lowered, and the lowering of the implement is performed using the weight of the implement itself. Such a working vehicle is provided with a lowering limiting device for limiting the lowering of the implement under its own weight by bringing an abutting member, which moves in tandem with the raising and lowering movement of the implement, into contact with an abutted member provided in the vehicle body when the implement is lowered.

In an example of the device for limiting the lowering of an implement on a working vehicle as described above, a stopper member in which plural abutted portions are formed in a line in the shape of a spiral staircase is provided as the abutted member, and a lowering limit position of a mower, which is an example of the implement, is changed to an arbitrary vertical position for mowing (vertical position for work) or a vertical position for travel/transport by rotating this stopper member (see JP 2004-236641A, for example).

With the above-described configuration, when the working vehicle is shifted from a working state to a travelling state, the implement is raised to an upper limit position by a raising and lowering device, and then the abutted member is rotated while the operational state of the abutted member is checked so that the abutted portion of the abutted member (the stopper member) with which the abutting member makes contact is changed from an abutted portion corresponding to an arbitrary vertical position for work to an abutted portion corresponding to the vertical position for travel/transport near the upper limit. Thus, the lowering limit position of the implement can be changed from the arbitrary vertical position for work to the vertical position for travel/transport, and the implement can be prevented from lowering from the vertical position for travel/transport.

When the working vehicle is shifted from the travelling state to the working state, the implement is raised to the upper limit position by the raising and lowering device, and then the abutted member is rotated while the operational state of the abutted member is checked so that the abutted portion of the abutted member with which the abutting member makes contact is changed from the abutted portion corresponding to the vertical position for travel/transport to an abutted portion corresponding to an arbitrary vertical position for work. Thus, the lowering limit position of the implement can be changed from the vertical position for travel/transport to the arbitrary vertical position for work, and the implement can be prevented from lowering from the arbitrary vertical position for work.

That is to say, every time the lowering limit position of the implement is changed between an arbitrary vertical position for work and the vertical position for travel/transport, it is necessary to rotate the abutted member while checking the operational state of the abutted member. For this reason, there is room for improvement in increasing the operability.

Moreover, since the abutted member has the plural abutted portions formed in a line in the shape of a spiral staircase, the larger the distance between an arbitrary vertical position for work and the vertical position for travel/transport is, the more time the operation of rotating the abutted member takes.

SUMMARY OF THE INVENTION

It is an object of the present invention to increase the operability when changing the lowering limit position of the implement between an arbitrary vertical position for work and the vertical position for travel/transport.

A working vehicle according to the invention includes a vehicle body supported by a plurality of wheels; an implement supported by the vehicle body via a link mechanism such that the implement can be raised and lowered, the implement being permitted to be lowered under its own weight; an abutting member that moves in tandem with the raising and lowering movement of the implement, the abutting member having a first portion and a second portion; a receiving piece for limiting the lowering of the implement under its own weight by receiving the first portion of the abutting member; and a manually operable first operating piece for changing the position of the receiving piece between a receiving position at which the receiving piece receives the first portion and a retracted position at which the receiving piece is unable to receive the first portion, wherein a lowering limiting position at which the lowering of the implement is limited by the receiving piece is set to a vertical position that is closer to the upper limit of a range of the raising or lowering movement of the implement than to the lower limit of that range.

According to this aspect of the invention, when the working vehicle is shifted from a working state to a travelling state, the implement is raised to an upper limit position, and then the first operating piece is operated so as to place the receiving piece in the receiving position. Thus, the implement can be prevented from lowering from a vertical position (the vertical position for travel/transport) near the upper limit.

In an embodiment of the invention, it is preferable that the working vehicle further includes an abutted member that is provided in the vehicle body and makes contact with the second portion of the abutting member during the lowering of the implement; and a second operating piece for changing the position of contact between the second portion and the abutted member.

In an embodiment of the invention, it is preferable that the first portion and the second portion are disposed on a laterally extending rotation shaft with a lateral space provided between each other.

In an embodiment of the invention, it is preferable that the receiving piece pivots about a laterally extending support shaft.

In an embodiment of the invention, it is preferable that the working vehicle further includes a raising and lowering device for raising and lowering the implement, the raising and lowering device having a hydraulic cylinder for rotating a laterally extending rotation shaft.

In an embodiment of the invention, it is preferable that the lowering limiting position is located within 20% of the range of the raising or lowering movement from the upper limit of that range.

In an embodiment of the invention, it is preferable that the receiving piece is elongated in a longitudinal direction and has a recess disposed between the support shaft and the first operating piece.

In an embodiment of the invention, it is preferable that the recess of the receiving piece has a first edge that extends generally perpendicular to the longitudinal direction and makes contact with the first portion, a second edge that extends generally in the longitudinal direction, and a third edge that faces the first edge.

DETAILED DESCRIPTION OF PREFERRED EMBODIMENTS

Hereinafter, an embodiment in which the present invention is applied to a riding mower, which is an example of a working vehicle, shall be described.

Figure 1:
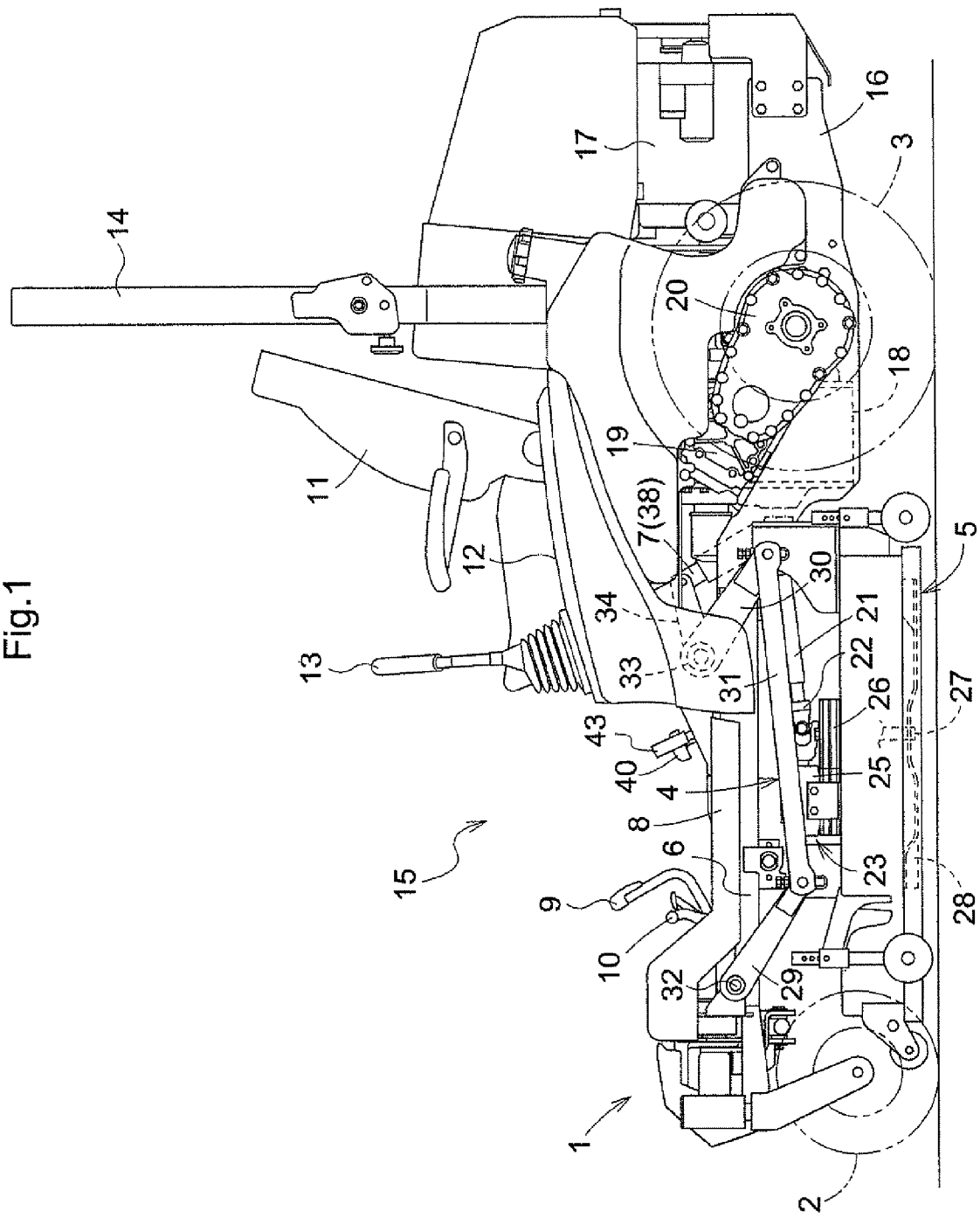
FIG. 1 is an overall side view of a riding mower.

FIG. 1 shows an overall side view of the riding mower. As shown in FIG. 1, the riding mower, which is described as an example in this embodiment, is configured as a mid-mount type by disposing a mower (an example of an implement) 5 between a pair of right and left front wheels 2 and a pair of right and left rear wheels 3 in a vehicle body 1 via a link mechanism 4 such that the mower 5 can be raised and lowered.

A front frame 6 made of a square pipe material or the like is disposed on the front side of the vehicle body 1. The front frame 6 supports the link mechanism 4, and the right and left front wheels 2 are disposed at the right and left edges of the front end of the front frame 6 such that the front wheels can be steered around vertically extending axes. The link mechanism 4 raises or lowers the mower 5 by actuating a single-acting hydraulic cylinder 7.

A boarding step 8 made of a sheet metal is mounted to the front frame 6 so as to cover almost the entire front frame 6 from above. A mat (not shown) made of rubber is laid on the surface of the boarding step 8, and a brake pedal 9 that is biased to return to a non-braking position and a lock pedal 10 that allows the brake pedal 9 to be locked and retained in a braking position against the bias are disposed at the center of a front portion of the boarding step 8. A driver's seat 11 is disposed above and behind the boarding step 8 such that the position of the driver's seat 11 is adjustable. A fender 12 and a shift lever 13 are disposed on each of the right and left sides of the driver's seat 11. An arch-shaped protective frame 14 is disposed upright behind the driver's seat 11. That is to say, in this riding mower, a boarding/driving portion 15 is formed on the front side of the vehicle body 1.

A rear frame 16 coupled to the rear end of the front frame 6 is disposed in a rear portion of the vehicle body 1. An air-cooled gasoline engine 17 is mounted to the rear frame 16. Motive power from the engine 17 is reduced by a power train 18 disposed below and in front of the engine 17, and divided into motive power for driving and motive power for working. A clutch (not shown) for connecting and disconnecting the motive power for working is provided inside the power train 18. The motive power for driving from the power train 18 is shifted by hydrostatic continuously variable transmissions (hereinafter abbreviated as HSTs) 19 that are linked to the right and left sides of the power train 18. The motive power that has been shifted by the right and left HSTs 19 is reduced by speed reducers 20 linked to lateral side faces of the HSTs 19 on the outer side of the vehicle body. The motive power that has been reduced by the right and left speed reducers 20 is transferred to the rear wheels 3 mounted to the speed reducers 20.

The right and left HSTs 19 are connected to the shift levers 13, with which speed-shifting shafts (not shown) are associated, so that they shift speeds based on pivoting movement of the corresponding shift levers 13 in the fore-and-aft directions. Thus, by pivoting the right and left shift levers 13 in the fore-and-aft directions, it is possible to perform a shifting operation using the right and left HSTs 19 corresponding to the shift levers 13, and it is possible to independently drive the right and left rear wheels 3 at variable speeds.

That is to say, since this riding mower is equipped with the right and left front wheels 2 that can be steered according to a follow-up steering method, and at the same time, equipped with the right and left rear wheels 3 that can be independently driven at variable speeds, each of a stopped state in which the right and left rear wheels 3 are stopped, a linear driving state in which the right and left rear wheels 3 are rotated forward or backward at equal velocities, a gentle turn state in which the right and left rear wheels 3 are rotated forward or backward at different velocities, a pivot turn state in which one of the right and left rear wheels 3 is stopped and the other is rotated forward or backward, and a spin turn state in which one of the right and left rear wheels 3 is rotated forward and the other is rotated backward can be produced freely.

Figure 2:
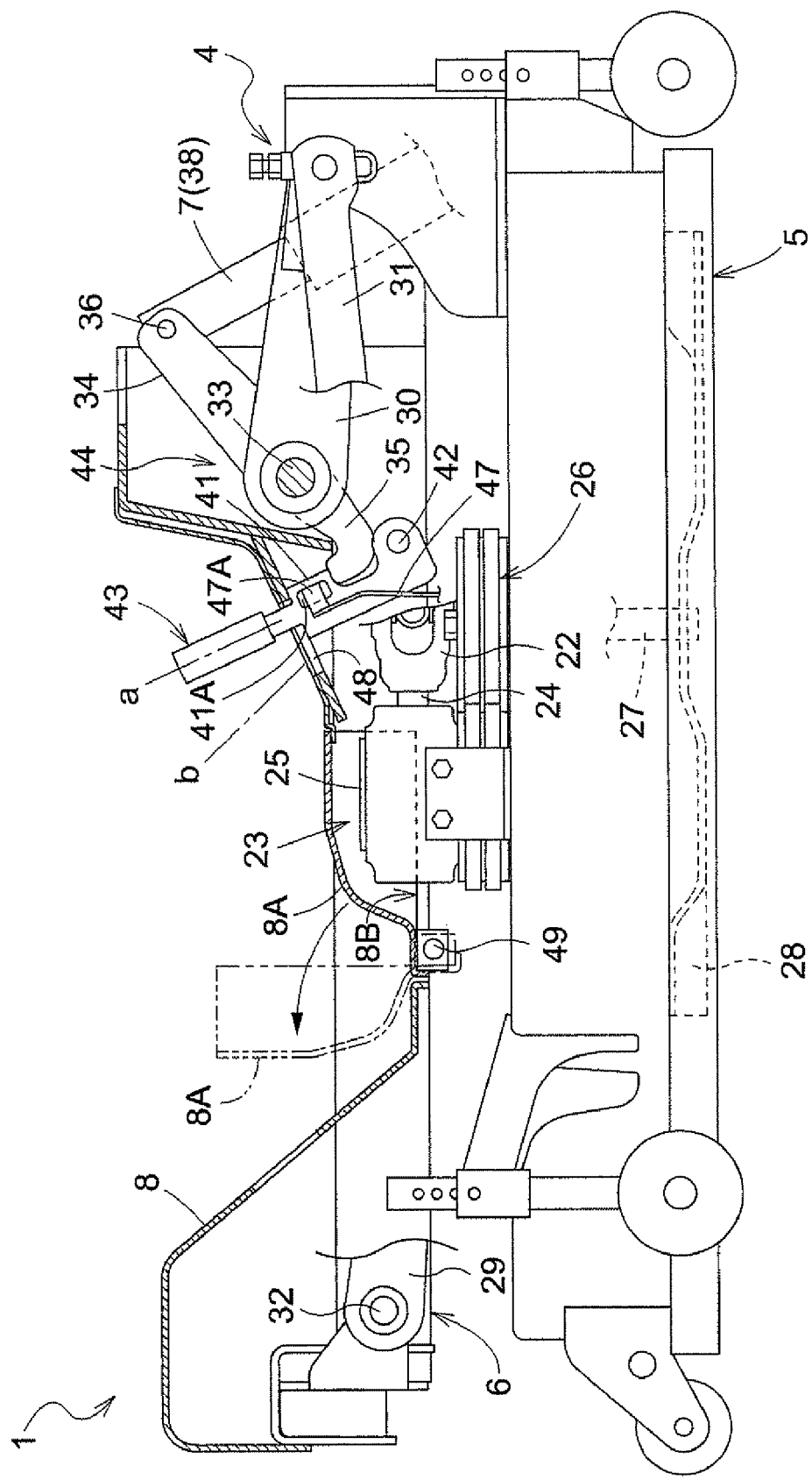
FIG. 2 is a vertical cross-sectional side view of a relevant part showing a structure for limiting the lowering of a mower.

As shown in FIGS. 1 and 2, the motive power for working from the power train 18 is transferred to an input shaft 24 of a power distribution device 23 disposed on the top of the mower 5, via a telescopic power transfer shaft 21 and universal joints 22 provided at either end of the power transfer shaft 21. In the power distribution device 23, motive power inputted to the input shaft 24 is transferred to a plurality of vertically disposed drive shafts 27 via a pair of bevel gears (not shown) provided inside a gear case 25 and a belt-type power transfer mechanism 26. The lower side of each of the drive shafts 27 is located inside the mower 5, and a corresponding blade 28 is integrally mounted to the lower end of the drive shaft 27 in a rotatable state. Thus, the plural blades 28 provided inside the mower 5 can be driven at a constant velocity, regardless of the driving speed and the driving state of the vehicle.

Figure 3:
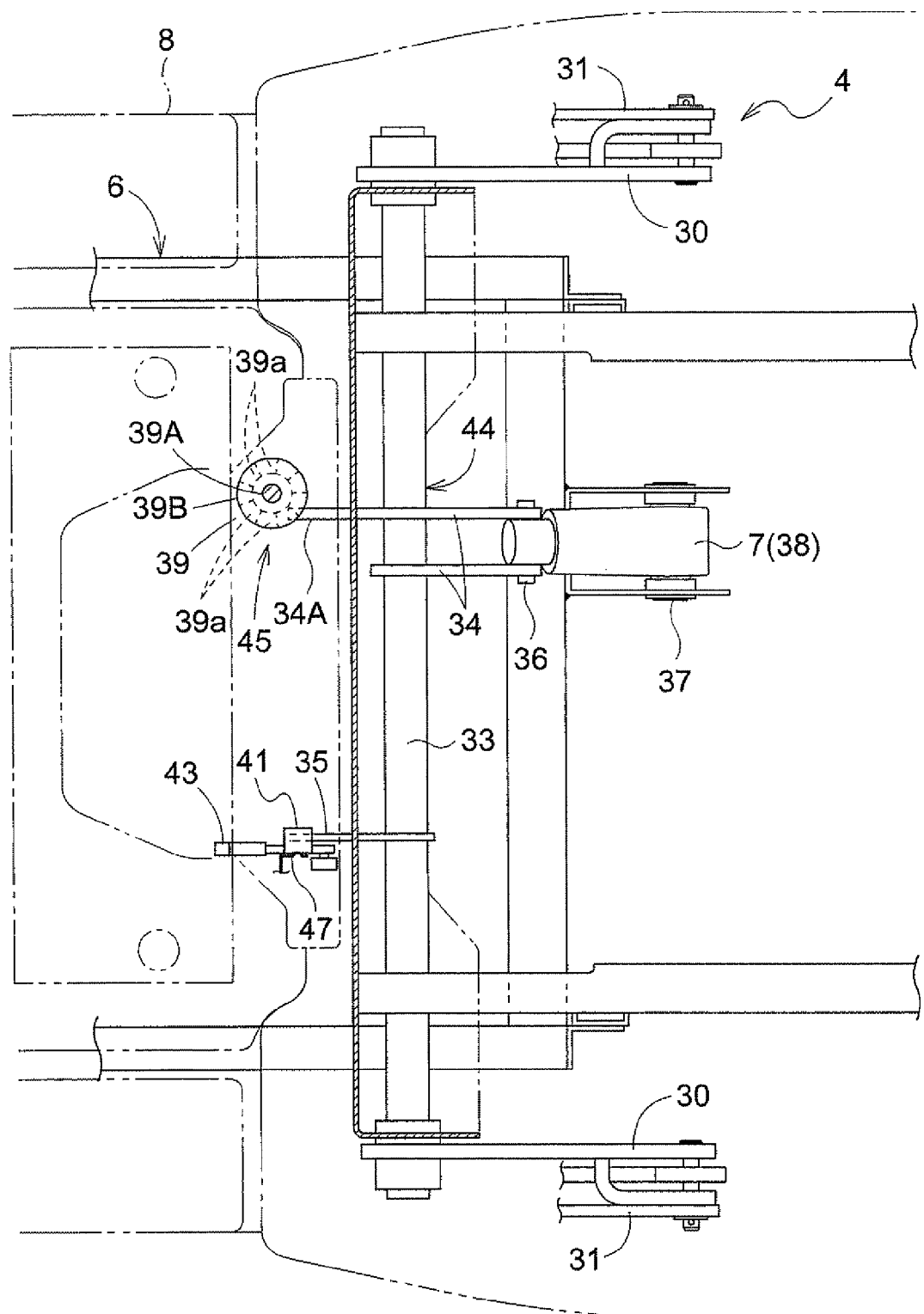
FIG. 3 is a horizontal cross-sectional plan view of a relevant part showing the structure for limiting the lowering of the mower.
Figure 4:
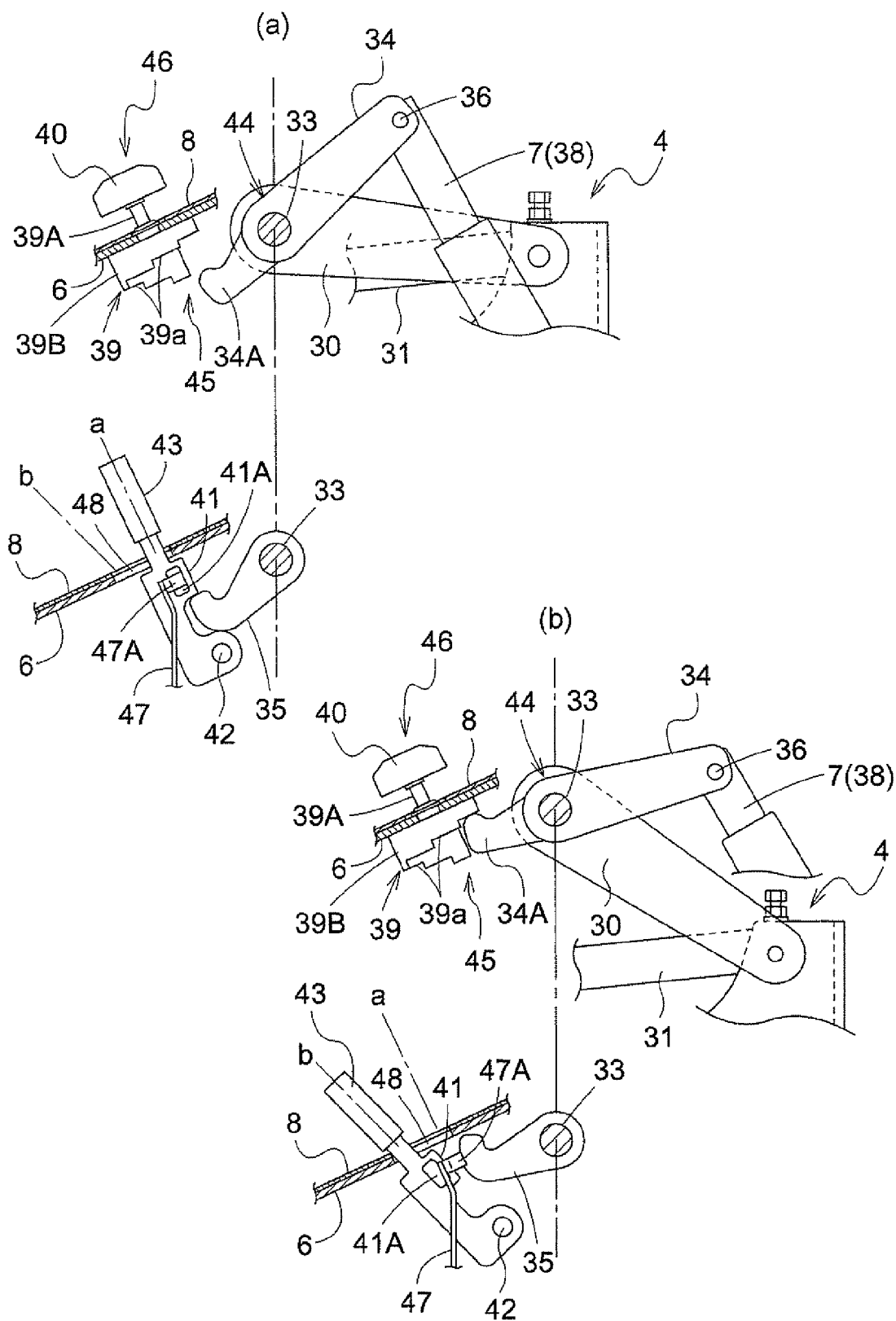
FIGS. 4A and 4B are vertical cross-sectional side views illustrating an effect of a receiving piece.
Figure 5:
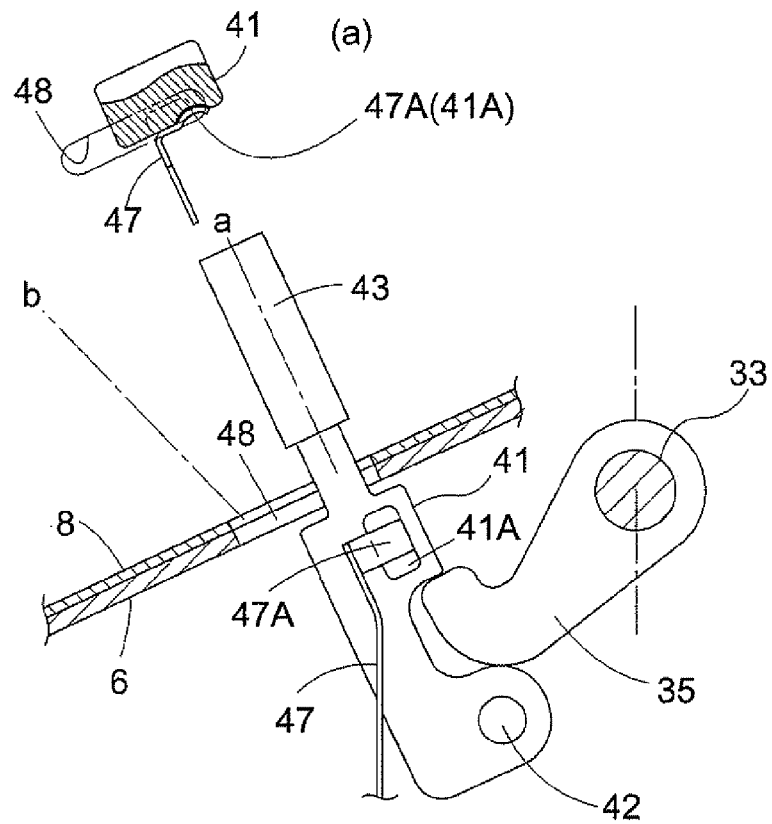
FIGS. 5A and 5B are horizontal cross-sectional plan views of a relevant part showing a structure for retaining the receiving piece.
Figure 5:
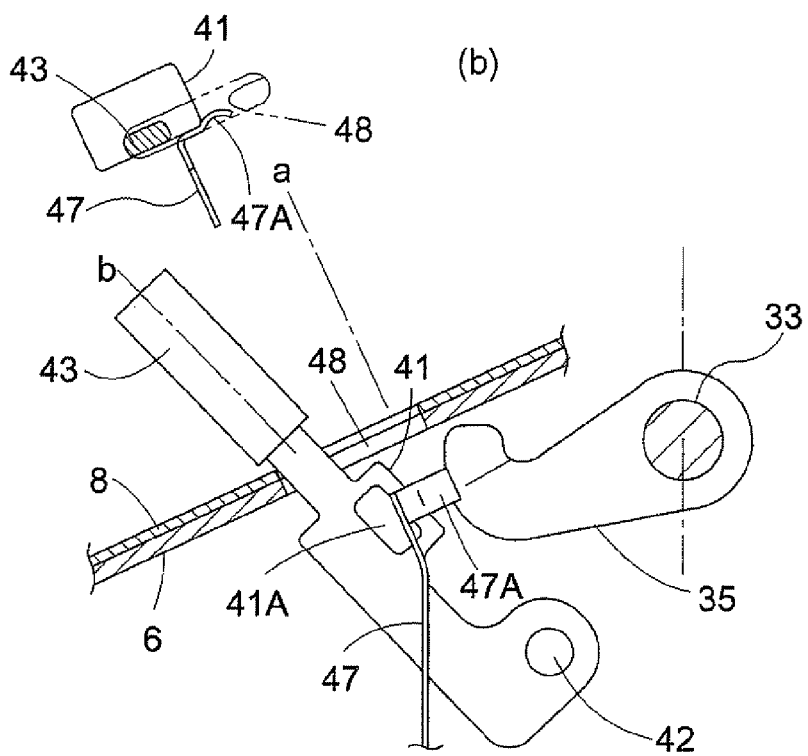

As shown in FIGS. 1 to 3, the link mechanism 4 has a pair of right and left front links 29, a pair of right and left rear links 30, a pair of right and left connecting links 31 extended between free ends of the front links 29 and free ends of the corresponding rear links 30, and so on, and is configured to be a parallel four bar linkage or a parallelogram linkage. The right and left front links 29 pivot around a laterally extending fulcrum pin 32, which is supported by the front frame 6 and serves as the fulcrum. The right and left rear links 30 are supported by a laterally extending rotation shaft 33, which is supported by the front frame 6 so as to be rotatable relative to the front frame 6. The rotation shaft 33 has a pair of right and left connecting arms 34 and a pivoting arm 35 that pivot integrally with the right and left rear links 30 via the rotation shaft 33. The right and left connecting arms 34 are coupled to a free end of the hydraulic cylinder 7 via a laterally extending pivotally supporting pin 36. The hydraulic cylinder 7 is supported by the front frame 6 via a laterally extending support shaft 37 so as to be pivotable relative to the front frame 6.

Although omitted from the figures, a raising or lowering lever is disposed on the right side of the driver's seat 11. The raising or lowering lever is connected to a control valve for controlling the flow of a hydraulic fluid with respect to the hydraulic cylinder 7. When the raising or lowering lever is moved to a raising position, the control valve is switched to a supply state that permits the hydraulic fluid to be supplied to the hydraulic cylinder 7 from a hydraulic pump; when the raising or lowering lever is moved to a lowering position, the control valve is switched to a discharge state that permits the hydraulic fluid to be discharged from the hydraulic cylinder 7; and when the raising or lowering lever is moved to a neutral position, the control valve is switched to a supply/discharge stopped state that prevents the hydraulic fluid from being supplied to or discharged from the hydraulic cylinder 7. When the control valve is switched to the supply state, the hydraulic cylinder 7 expands against the weight of the mower 5 because the hydraulic fluid from the hydraulic pump is supplied thereto; when the control valve is switched to the discharge state, the hydraulic cylinder 7 contracts because the hydraulic fluid inside the cylinder is discharged under the weight of the mower 5; and when the control valve is switched to the supply/discharge stopped state, the hydraulic cylinder 7 stops expanding or contracting because the amount of the hydraulic fluid inside the cylinder is maintained at a certain level.

That is to say, the raising or lowering lever, the control valve, the hydraulic pump, the hydraulic cylinder 7, and the like constitute a raising and lowering device 38 for raising the mower 5 using the hydraulic fluid from the hydraulic pump and lowering the mower 5 using the weight of the mower 5 itself.

As shown in FIGS. 2 to 4B, an extending portion 34A extending from the rotation shaft 33 toward the front side of the vehicle body is formed integrally with the right connecting arm 34. When the mower 5 reaches a predetermined lowering limit position, the extending portion 34A makes contact with or abuts against one of the bottom surfaces of an abutted member 39, provided in the front frame 6, from below. The abutted member 39 is constituted by a forwardly inclined shaft 39A supported by the front frame 6 so as to be rotatable relative to the front frame 6 and a tubular portion 39B coupled to the bottom of the forwardly inclined shaft 39A so as to rotate integrally with the forwardly inclined shaft 39A. The upper side of the forwardly inclined shaft 39A is exposed to the boarding/driving portion 15, and a circular dial 40 is coupled to the upper end of the forwardly inclined shaft 39A so as to rotate integrally with the forwardly inclined shaft 39A. Plural abutted portions 39a that can make contact with the extending portion 34A are formed at the bottom of the tubular portion 39B. The abutted portions 39a have the shape of a spiral staircase. That is to say, by rotating the dial 40, it is possible to change the abutted portion 39A with which the extending portion 34A makes contact.

Although omitted from the figures, a retaining mechanism for preventing free rotation of the abutted member 39 while permitting a change of the contact position of the abutted member 39 with respect to the extending portion 34A (i.e., rotation of the abutted member 39) effected by rotating the dial 40.

When the mower 5 reaches the predetermined lowering limit position, the pivoting arm 35 is received (which means contacted or abutted thereby stopped) by a receiving piece 41 provided in the front frame 6. The receiving piece 41 is formed integrally with an operating lever 43 that is pivotably supported by the front frame 6 via a laterally extending support shaft 42, and limits the lowering of the mower 5 under its own weight by receiving the pivoting arm 35. The receiving piece is elongated in a longitudinal direction and has a recess disposed between the support shaft 42 and the operating lever 43. The recess has a first edge that extends generally perpendicular to the longitudinal direction and makes contact with the pivoting arm 35, a second edge that extends generally in the longitudinal direction, and a third edge that faces the first edge. When the operating lever 43 is pivoted, the operating lever 43 pivots together with the receiving piece 41 to change the position between a receiving position a, at which the receiving piece 41 can receive the pivoting arm 35, and a retracted position b, at which the receiving piece 41 cannot receive the pivoting arm 35. The position at which the receiving piece 41 receives the pivoting arm 35 is set to a predetermined position by which the mower 5 is held in a retracted position in which the mower 5 does not perform a mowing operation as a result of the reception. The retracted position is a position at which the lowering of the mower 5 is limited by the receiving piece 41, and is set to a vertical position near the upper limit of a range of the raising or lowering movement of the mower 5.

That is to say, the rotation shaft 33, the extending portion 34A of the right connecting arm 34, and the pivoting arm 35 constitute an abutting member 44 that moves in tandem with the raising and lowering movement of the mower 5 and can be received by the receiving piece 41. This abutting member 44 and the abutted member 39 constitute a lowering limiting means 45 for limiting the lowering of the mower 5 under its own weight when the mower 5 is lowered. The dial 40 serves as an operating piece that can change setting of the position of contact between the abutting member 44 and the abutted member 39. This dial 40 and the lowering limiting means 45 constitute a lower limit setting means 46 for changing a lowering limit position, at which the lowering of the mower 5 under its own weight is limited, based on the operation of the dial 40. The operating lever 43 serves as an auxiliary operating piece for changing the position of the receiving piece 41 between the receiving position a at which the receiving piece 41 can receive the abutting member 44 and the retracted position b at which the receiving piece 41 cannot receive the abutting member 44.

With this configuration, by raising the mower 5 to an upper limit position with the raising and lowering device 38 and then operating the dial 40 to change the abutted portion 39a of the abutted member 39 with which the abutting member 44 makes contact, it is possible to prevent the mower 5 from lowering from an arbitrary vertical position for mowing corresponding to the abutted portion 39a that has been changed. Thus, during the mowing operation when the mower 5 is lowered under its own weight, it is possible to place the mower 5 at an arbitrary vertical position for mowing set by the lower limit setting means 46, which makes it possible to ensure that the height of grass or the like after the mowing operation is uniform.

When the vehicle is shifted from a working state to a travelling state, the mower 5 is raised to the upper limit position by the raising and lowering device 38, and then the operating lever 43 is pivoted so as to place the receiving piece 41 in the receiving position a. Thus, the mower 5 can be prevented from lowering from the retracted position for travel/transport.

When the vehicle is shifted from the travelling state to the working state, the mower 5 is raised to the upper limit position by the raising and lowering device 38, and then the operating lever 43 is pivoted so as to place the receiving piece 41 in the retracted position b. Thus, the mower 5 can be prevented from lowering from an arbitrary vertical position for mowing set by the lower limit setting means 46.

That is to say, by switching the position of the operating lever 43 together with the receiving piece 41 to either of the receiving position a or the retracted position b with the operating lever 43, it is possible to easily change the lowering limit position of the mower 5 between an arbitrary vertical position for mowing and the retracted position for travel/transport, and it is possible to increase the operability when compared to the case where the lowering limit position is changed with the lower limit setting means 46.

As shown in FIGS. 2 to 5B, a recess 41A, into which a protruding portion 47A of a locking piece 47 constituted by a plate spring and provided in the front frame 6 is inserted, is formed in a lateral side face of the receiving piece 41. When the operating lever 43 is moved to the receiving position a, the protruding portion 47A of the locking piece 47 is inserted into the recess 41A of the receiving piece 41, and thus the locking piece 47 retains the operating lever 43 together with the receiving piece 41 in the receiving position a. Moreover, when the operating lever 43 is moved to the retracted position b, at which the front edge of the operating lever 43 makes contact with the front end of a guide groove 48, the protruding portion 47A of the locking piece 47 acts on the rear end edge of the receiving piece 41, the operating lever 43 together with the receiving piece 41 are retained in the retracted position b.

Thus, the operability when the lower limit position of the mower 5 is changed from an arbitrary vertical position for mowing to the retracted position for travel/transport can be increased even more. Moreover, vibration of the operating lever 43 and the receiving piece 41 that occurs when the operating lever 43 and the receiving piece 41 are retained in the retracted position b under their own respective weights can be prevented.

As shown in FIG. 2, a bulged portion 8A into which the gear case 25 can be inserted when the mower 5 is placed in the retracted position for travel/transport is formed in the boarding step 8. The bulged portion 8A is provided in the boarding step 8 such that the bulged portion 8A can be pivoted around a laterally extending support shaft 49, between opened and closed positions. Thus, when operations such as maintenance of the gear case 25, cleaning of the top surface of the mower 5, and greasing of the universal joints 22 are performed, the operations can be easily performed through an opening 8B formed by pivoting the bulged portion 8A into the opened position, without requiring the mower 5 to be removed from between the right and left front wheels 2 and the right and left rear wheels 3 of the vehicle body 1.

Other Embodiments (1) The working vehicle to which the present invention is applied may be, for example, a mid-mount mower in which the mower 5 is disposed between the right and left front wheels 2 and the right and left rear wheels 3 in the vehicle body 1 of a four-wheel drive vehicle, a front mower in which the mower 5 is disposed in front of the right and left front wheels 2 in the vehicle body 1, or a tractor that can be additionally equipped with an implement such as the mower 5.

(2) Various changes can be made to the configuration of the abutted member 39. For example, a component with a bottom edge that is inclined in a spiral form may be employed as the tubular portion 39B of the abutted member 39 when configuring the abutted member 39.

(3) Various changes can be made to the configuration of the abutting member 44. For example, a configuration in which the extending portion 34A that makes partial contact with the abutted member 39 and a received portion that can be received by the receiving piece 41 are formed in the right connecting arm 34, and the abutting member 44 is constituted by the right connecting arm 34 alone, is also possible.

(4) Various changes can be made to the configuration of the lowering limiting means 45. For example, the lowering limiting means 45 may be constituted by the abutted member 39 according to the embodiment described in section (2) above and the abutting member 44 according to the embodiment described in section (3) above.

(5) As the operating piece 40, an operating lever or the like may be employed.

(6) Various changes can be made to the configuration of the lower limit setting means 46. For example, the lower limit setting means 46 may be constituted by the lowering limiting means 45 according to the embodiment described in section (4) above and the operating piece 40 according to the embodiment described in section (5) above.

(7) Various changes can be made to the configuration of the receiving piece 41 and the auxiliary operating piece 43. For example, the receiving piece 41 may be slid to change the position between the receiving position a and the retracted position b, by operating the auxiliary operating piece 43.

What is claimed is:

1. A working vehicle comprising:
   a vehicle body having a frame;
   a plurality of wheels supporting the vehicle body;
   an implement supported by the frame via a link mechanism such that the implement can be raised and lowered, the implement being permitted to be lowered under its own weight;
   an abutting member that moves in tandem with the raising and lowering movement of the implement and has a first portion, a second portion and a laterally extending rotation shaft pivotally supported by the frame, the first and second portions disposed on the rotation shaft with a lateral space provided therebetween;
   a receiving piece which is swingably supported by the frame between a receiving position at which the receiving piece receives the first portion of the abutting member and a retracted position at which the receiving piece is unable to receive the first portion and configured to limit the lowering of the implement under its own weight by receiving the first portion;
   a first operating piece which is manually operable independently of the movement of the implement and configured to change the position of the receiving piece between the receiving position and the retracted position, wherein a lowering limiting position at which the lowering of the implement is limited by a reception of the first portion by the receiving piece is set to a vertical position that is closer to an upper limit of a range of the raising and lowering movement of the implement than to a lower limit of the range;
   an abutted member that is provided on the frame and makes contact with the second portion of the abutting member during the lowering of the implement;
   a second operating piece for changing the position of contact between the second portion and the abutted member; and
   a raising and lowering device for raising and lowering the implement, which is supported by the frame and has a hydraulic cylinder for rotating the rotation shaft.

2. The working vehicle according to claim 1, wherein the lowering limiting position is located within 20% of the range of the raising or lowering movement from the upper limit of the range.

3. The working vehicle according to claim 1, wherein
   the receiving piece has a longitudinal direction and has a recess disposed between a swing axis of the receiving piece and the first operating piece, and
   wherein the recess of the receiving piece is formed by a first edge that extends generally perpendicular to the longitudinal direction and makes contact with the first portion, a second edge that extends generally in the longitudinal direction, and a third edge that faces the first edge.

4. The working vehicle according to claim 1, wherein when the receiving piece receives the first portion, a space is provided between the second portion and the abutted member.

5. The working vehicle according to claim 1, wherein when the second portion and the abutted member are brought into contact with each other, further lowering movement of the implement is blocked.

6. The working vehicle according to claim 1, wherein when the implement is lowered, the rotation shaft is rotated in a direction that rotatably raises the first and second portions.

7. The working vehicle according to claim 1, wherein when the second portion is brought into contact with the abutted member, the second portion abuts against the abutted member from a bottom side of the abutted member.

8. The working vehicle according to claim 1, wherein the change of the position of the receiving piece is switching between said two positions.

9. The working vehicle according to claim 1, wherein a swing motion of the first operating piece is directly converted into a swing motion of the receiving piece.

10. The working vehicle according to claim 1, wherein the reception of the first portion by the receiving piece is configured to limit both the lowering of the implement under its own weight and raising and lowering of the implement by the raising and lower device.

11. A working vehicle comprising:
a vehicle body having a frame;
a plurality of wheels supporting the vehicle body;
an implement supported by the frame via a link mechanism such that the implement can be raised and lowered, the implement being permitted to be lowered under its own weight;
an abutting member that moves in tandem with the raising and lowering movement of the implement and has a first portion, a second portion and a laterally extending rotation shaft pivotally supported by the frame, the first and second portions disposed on the rotation shaft with a lateral space provided therebetween;
a receiving piece which is pivotally supported by the frame through a laterally extending support shaft and configured to limit the lowering of the implement under its own weight by receiving the first portion of the abutting member;
a first operating piece which is manually operable independently of the movement of the implement and configured to change the position of the receiving piece between a receiving position at which the receiving piece receives the first portion and a retracted position at which the receiving piece is unable to receive the first portion, wherein a lowering limiting position at which the lowering of the implement is limited by the receiving piece is set to a vertical position that is closer to an upper limit of a range of the raising and lowering movement of the implement than to a lower limit of the range;
an abutted member that is provided on the frame and makes contact with the second portion of the abutting member during the lowering of the implement;
a second operating piece for changing the position of contact between the second portion and the abutted member; and
a raising and lowering device for raising and lowering the implement, which is supported by the frame and has a hydraulic cylinder for rotating the rotation shaft,
wherein the receiving piece has a longitudinal direction and has a recess disposed between the support shaft and the first operating piece, and wherein the recess of the receiving piece is formed by a first edge that extends generally perpendicular to the longitudinal direction and makes contact with the first portion, a second edge that extends generally in the longitudinal direction, and a third edge that faces the first edge.

* * * * *